(12) United States Patent
Gleason et al.

(10) Patent No.: US 10,246,279 B2
(45) Date of Patent: Apr. 2, 2019

(54) IMPACT VEHICLE RESTRAINT WITH STRUCTURED IMPACT ZONE

(71) Applicant: Nordock, Inc.

(72) Inventors: Denis Gleason, Bowmanville (CA); David Harrington, Port Hope (CA)

(73) Assignee: Nordock, Inc., Bowmanville/Ontario (CA)

( * ) Notice: Subject to any disclaimer, the term of this patent is extended or adjusted under 35 U.S.C. 154(b) by 260 days.

(21) Appl. No.: 15/079,969

(22) Filed: Mar. 24, 2016

(65) Prior Publication Data

US 2017/0275106 A1    Sep. 28, 2017

(51) Int. Cl.
*B65G 69/00* (2006.01)

(52) U.S. Cl.
CPC .................. *B65G 69/003* (2013.01)

(58) Field of Classification Search
CPC .................................................... B65G 69/003
See application file for complete search history.

(56) References Cited

U.S. PATENT DOCUMENTS

| | | | |
|---|---|---|---|
| 4,264,259 A | 4/1981 | Hipp | |
| 4,488,325 A | 12/1984 | Bennett et al. | |
| 4,560,315 A | 12/1985 | Hahn | |
| 4,964,777 A | 10/1990 | Kleynjans et al. | |
| 5,096,359 A | 3/1992 | Alexander | |
| 5,259,718 A * | 11/1993 | Alexander | B65G 69/003 414/401 |
| 5,336,033 A * | 8/1994 | Alexander | B65G 69/003 414/396 |
| 6,162,005 A | 12/2000 | Fritz | |
| 6,431,819 B1 * | 8/2002 | Hahn | B65G 69/003 414/401 |
| 7,384,229 B2 | 6/2008 | Gleason | |
| 7,841,823 B2 * | 11/2010 | Sveum | B65G 69/003 414/401 |
| 8,596,949 B2 | 12/2013 | Harrington | |
| 8,678,736 B2 * | 3/2014 | Andersen | B65G 69/003 414/401 |
| 9,428,349 B2 * | 8/2016 | Muhl | F16H 21/26 |
| 2007/0248440 A1 * | 10/2007 | Andersen | B65G 69/003 414/401 |

* cited by examiner

*Primary Examiner* — Saul Rodriguez
*Assistant Examiner* — Ashley K Romano
(74) *Attorney, Agent, or Firm* — Jeffrey S. Sokol

(57) ABSTRACT

The present invention is an impact vehicle restraint with spaced shear plates that hold a rotating hook and rotating ramp extension leg. The forward ends of the shear plates support an impact zone structure that forms a ramp plane that accommodates a wide variety of trailer ICC bars. The impact zone structure takes the form of a single central impact plate or dual side impact strips. The central impact plate travels with the hook and spans and rests on the shear plates when the hook is retracted. The dual side impact strips are made of weldable metal with a yield strength of at least 100,000 psi and a Brinell Hardness of at least 300. The central impact plate and hardened strips allow unobstructed rotation of the hook and ramp extension leg. The hook is free to pass through a ramp plane in both embodiments.

16 Claims, 15 Drawing Sheets

IMPACT VEHICLE RESTRAINT WITH STRUCTURED IMPACT ZONE

FIELD OF THE INVENTION

The invention pertains to an impact vehicle restraint mounted to the front wall of a loading dock, the restraint having a carriage with spaced shear plates that carry a hook and form a ramp with a structured impact zone against which an ICC bar of a trailer impacts to position the carriage before deploying the hook to secure the ICC bar.

BACKGROUND OF THE INVENTION

Vehicle restraints are utilized to increase safety at a loading dock. The restraints secure a truck trailer to the dock when loading or unloading the trailer. The restraints typically engage a rear horizontal bar referred to as the rear impact guard (RIG) or ICC bar. The RIG or ICC bar is located at the rear end of the trailer below the trailer bed. When the trailer backs up to an available loading dock stall, the ICC bar is positioned close to the face wall of the dock. Bumpers typically extend from the face wall to protect the trailer and dock. Trailer restraints typically include a hooking device located in front of the dock and anchored to the dock or ground. When in use, the hooking device forms a barrier in front of the ICC bar to secure the trailer so it cannot move away from the dock. The restraint helps avoid accidents by securing the trailer to the loading dock so the truck driver does not inadvertently pull the trailer away when the trailer is being loaded or unloaded. The restraint also helps prevent the trailer from being pushed away from the dock during the process of loading and unloading the trailer. For example, when a fork lift carrying heavy cargo rides onto the trailer and abruptly stops, the trailer tends to move away from the dock.

Conventional trailer restraints include storable restraints and impact restraints. Storable restraints move between a raised operating position and a lower stored position. When in the stored position, a trailer backing into an available loading dock stall should clear the device. Conventional storable restraints are disclosed in U.S. Pat. Nos. 4,488,325, 5,096,359, 4,964,777 and 7,384,229. When the trailer and dock leveler are properly positioned with the lip of the leveler resting on the trailer bed, the stored restraint is activated to rise up and securely engage the ICC bar. Restraint mechanisms of this style are powered into their raised position by motors, springs, or other mechanical means.

Impact restraints include a movable carriage that adjusts to the height of the trailer ICC bar. The carriage includes a pair of spaced shear plates that hold a selectively rotatable hook as shown in FIG. 1. The front ends of the shear plates form a ramp or sloped portion of the carriage. The hook is stored between the plates and behind the ramp. When a trailer backs into an available stall, the ICC bar engages the ramp. As the trailer continues backing into the stall, its ICC bar pushes the ramp and carriage down until the ICC bar engages a flat top portion of the carriage. The ICC bar then moves along this flat top portion until the bar is aligned above the hook as disclosed in U.S. Pat. Nos. 4,264,259, 4,560,315, 6,162,005 and 8,596,949. The carriage has a drive system with a motor to rotate the hook. An operator actuates the motor when the ICC bar is aligned over the hook. The motor rotates the hook so that it emerges from the carriage and securely engages the ICC bar to hold it in a secured or locked position.

A problem with conventional impact restraints is that some trailers have an ICC bar with a sharp rearward facing lower edge. This sharp edge can bite into and damage the ramp as shown in FIG. 1. Resolving this situation is problematic. The hook is carried between the shear plates. Any design must allow the free movement of the hook. Fixing a ramp between the spaced shear plates is not feasible as this will obstruct the deployment of the hook. Increasing the thickness of the shear plates is cost prohibitive as the plates are relatively large and the added weight would reduce the effectiveness of the biasing springs to ensure the carriage and hook remain engaged with the trailer during use.

Another problem with conventional impact restraints is that the carriage is biased to a raise home position a predetermined height above the ground. While most trailers have an ICC bar located at a height that allows the bar to engage the ramp formed by the shear plates, some trailers locate the ICC bar lower than normal. Accordingly, the shear plates hold a leg or toe extension that extends the length of the ramp to accommodate these lower ICC bars. The upper end of the ramp leg is rotatably secured between the shear plates. The leg must freely rotate between its ramp forming and collapsed positions. When the ICC bar pushes the carriage down to a position where the lower end of the leg hits the ground, the leg must rotate forward into a collapsed position. If leg rotation is obstructed, the trailer ICC bar will not properly engage the flat upper surface of the carriage to allow proper deployment of the hook, or the trailer can ride up onto the carriage with the weight of the trailer pressing down on and damaging the restraint.

Another problem with conventional impact restraints is that the space between the shear plates should remain free of obstructions that could inhibit the movement of the hook and leg extension.

The present invention is intended to resolve these and other problems.

SUMMARY OF THE INVENTION

The present invention relates to an impact vehicle restraint with spaced shear plates that hold a rotating hook and rotating ramp extension leg. The forward ends of the shear plates support an impact zone structure that forms a ramp plane that accommodates a wide variety of trailer ICC bars. The impact zone structure takes the form of a single central impact plate or dual side impact strips. The central impact plate travels with the hook, and spans the width of and rests on the shear plates when the hook is retracted. The dual side impact strips are made of hardened weldable metal strips with a minimum yield strength of at least about 100,000 psi and a Brinell Hardness of at least about 300 HB. The impact strips are welded to and project outwardly from the shear plates. Both the central impact plate and dual side impact strip embodiments allow unobstructed rotation of the hook and ramp extension leg. The hook is free to pass through a ramp plane in both embodiments.

An advantage of the present vehicle restraint is that provides a structured ramp impact zone so that the ICC bar of a wide variety of trailers smoothly engage and do not damage the ramp. Even ICC bars with a sharp rearward facing lower edge will smoothly engage the ramp. The ICC bar does not bite into and damage the ramp.

Another advantage of the present vehicle restraint is that the structure ramp impact zone does not obstruct the deployment and retraction of the hook. When the impact zone is formed by a central ramp impact plate, the impact plate travels with the hook to allow the hook to deploy and retract through the ramp plane. The impact plate does not obstruct hook movement. When the ramp plane is formed by dual side impact plates, the impact strips straddle the hook do not obstruct its deployment or retraction. The dual impact zones are formed by hardened spaced impact strips secured to the front end of and extend outwardly from the shear plates.

A further advantage of the present vehicle restraint is that the structure ramp impact zone does not obstruct the rotation of the ramp extension leg. When the impact zone is formed by a central ramp impact plate, the impact plate has a lower end spaced from the extension leg to allow its rotation. At the location where the impact plate and leg extension meet, the impact zone is formed by the front ends of the shear plates or the impact plate has side tabs that overlap with the extension leg. For the dual impact zone embodiment, the hardened spaced impact strips extend outwardly from the hook and do not interfere with the rotation of the leg extension.

Other aspects and advantages of the invention will become apparent upon making reference to the specification, claims and drawings.

DESCRIPTION OF THE EMBODIMENTS

While this invention is susceptible of embodiments in many different forms, the drawings show and the specification describes several embodiments of the invention. It should be understood that the drawings and specification are to be considered an exemplification of the principles of the invention. They are not intended to limit the broad aspects of the invention to the embodiments illustrated.

Figure 1:
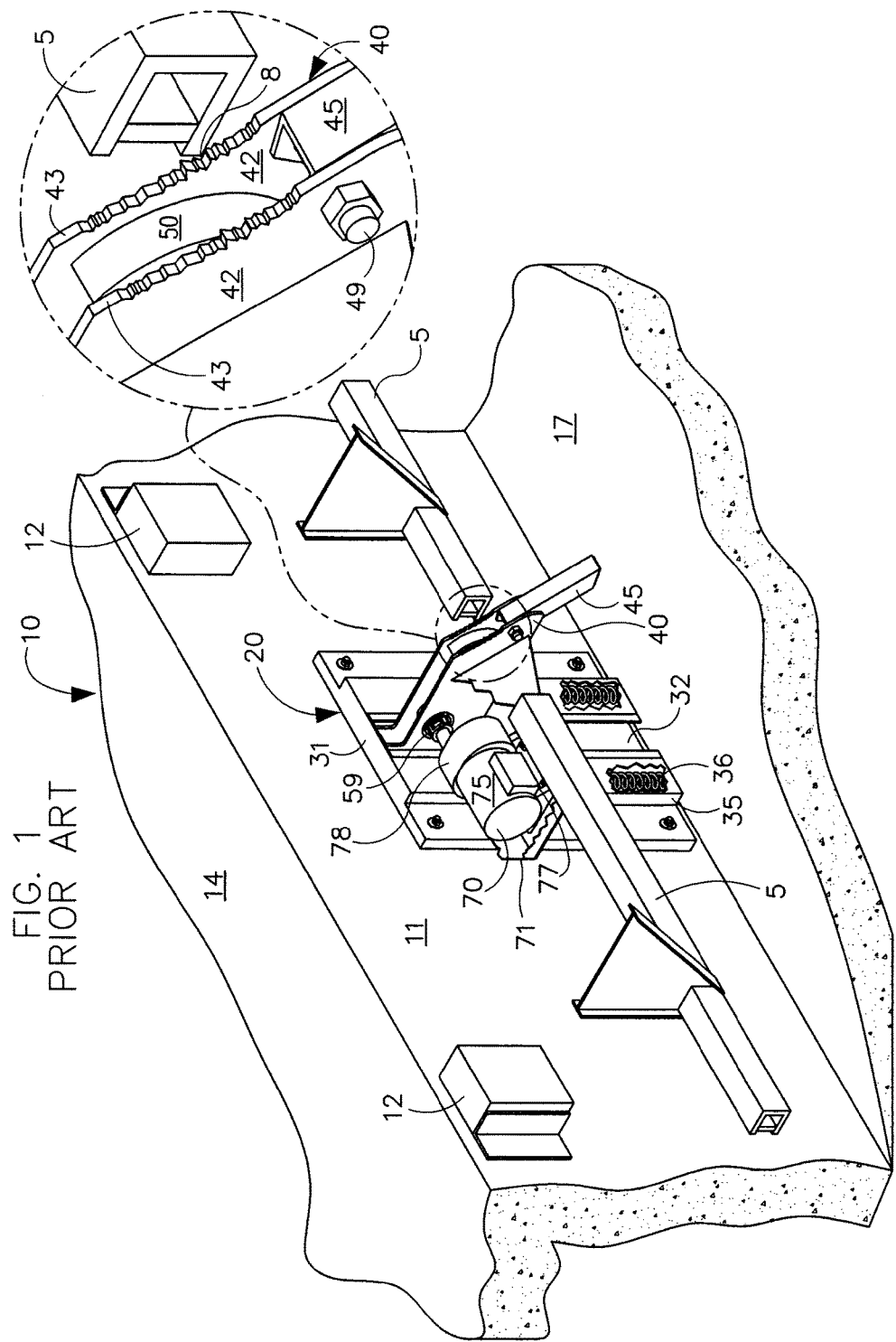
FIG. 1 is a perspective view of a conventional impact vehicle restraint with the ramp forming edges of its shear plates damaged by the ICC bar.

Conventional truck trailers have a rear impact guard (RIG) or ICC bar 5. The elongated bar 5 is typically parallel to and spans the width of the rear end of trailer. The bar 5 has a square or rectangular cross-sectional shape with four-sides as shown in FIG. 1. Some trailers are equipped with an ICC bar 5 having one or more sharp rearward facing edges 8. The bar 5 has a lower or downward facing surface that is generally normal to its forward facing or front surface. When the trailer is backed into a loading dock 10, the rear end of the trailer is generally parallel to and moves toward the face or front wall 11 of the dock. The vertical face 11 of the dock 10 typically has one or more bumpers 12 to help prevent inadvertent damage to the dock or trailer. The bumpers 12 have a front surface that spaces the trailer a few inches from the front wall 11 of the dock 10. The horizontal upper surface 14 of the dock 10 is elevated above the ground surface or roadway 17 so that the bed of the trailer is generally level with the upper surface of the dock. A dock leveler (not shown) is frequently provided to bridge the gap between the loading dock floor and the trailer bed, and accommodate any difference in height between the trailer bed and the dock floor 14.

The present invention generally relates to a loading dock impact trailer restraint that is generally shown as reference number 20 in FIGS. 2-11. The trailer restraint 20 is provided for installation as a prefabricated, pre-welded and generally preassembled device or apparatus. The restraint 20 is preferably secured to the front wall 11 of the loading dock 10, and centered between any spaced apart bumpers 12. The restraint 20 and its components are robustly designed to withstand a simulated trailer pull-out force of about 100,000 lbs. Various components are made of steal, and are welded together for increased strength. The steal components are zinc plated for high corrosion resistance.

The trailer restraint 20 includes a rear mounting plate 31 anchored to the front wall 11 of the loading dock 10. The mounting plate 31 is made of steal and has a uniform thickness of about ⅜ of an inch. The plate 31 has flat front and rear surfaces. The rear surface of the plate 31 flushly engages the front wall 11 of the dock 10 so that its front surface is vertically orientated and parallel to the front of the dock. The plate 31 has a generally rectangular shape with top, bottom and side edges. The plate 31 is about 26 inches tall, 19 inches wide and ⅜ inches thick. The plate 31 is anchored to the front 11 of the dock 10 by a number of bolts located proximal to its side edges. The fasteners are preferably concrete expansion anchors or concrete wedge anchors. Alternatively, the plate 31 can be welded to an embedded, steal, dock face plate (not shown).

A vertical track 32 is formed by the mounting plate 31 and two spaced apart L-shaped flanges 33 that forms a central vertical channel about 6 inches wide. The flanges 33 are welded or otherwise rigidly secured to the mounting plate 31, and are robustly sized to handle the large loads experienced during operation. The top and bottom edges of the track 32 are generally flush with the top and bottom edges of the mounting plate 31, so that the track 32 has a total height of about 26 inches. A steal cap is secured to the top of the track 32 to close the track.

Figure 2:
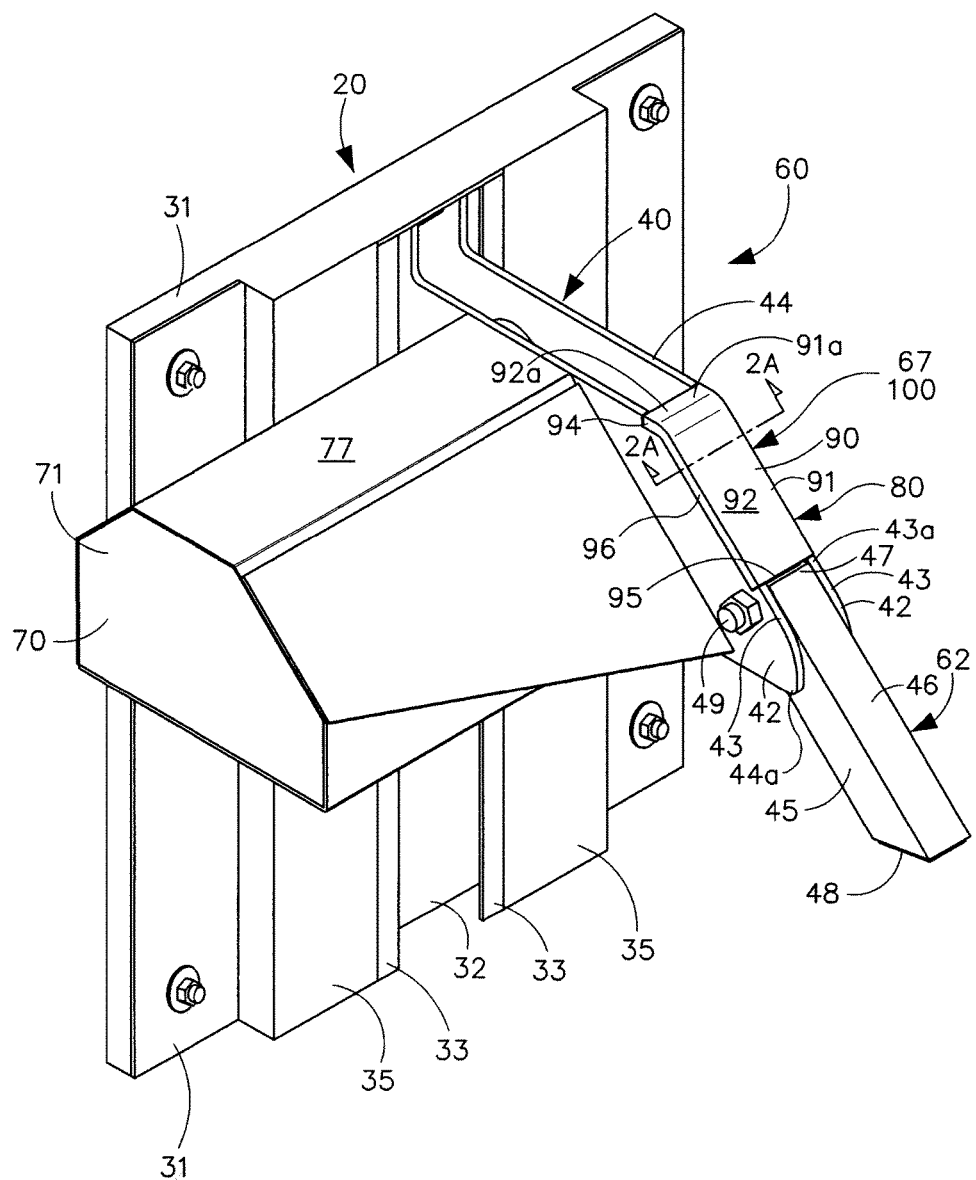
FIG. 2 is a perspective view of a first embodiment of the impact vehicle restraint in its upwardly biased position with the structured ramp impact zone and ramp plane formed by a central impact plate 90 flushly and supportably engaging recesses in the shear plates to form a continuous side-to-side ramp, and with the ramp extension leg aligned with the ramp plane.
Figure 2A:
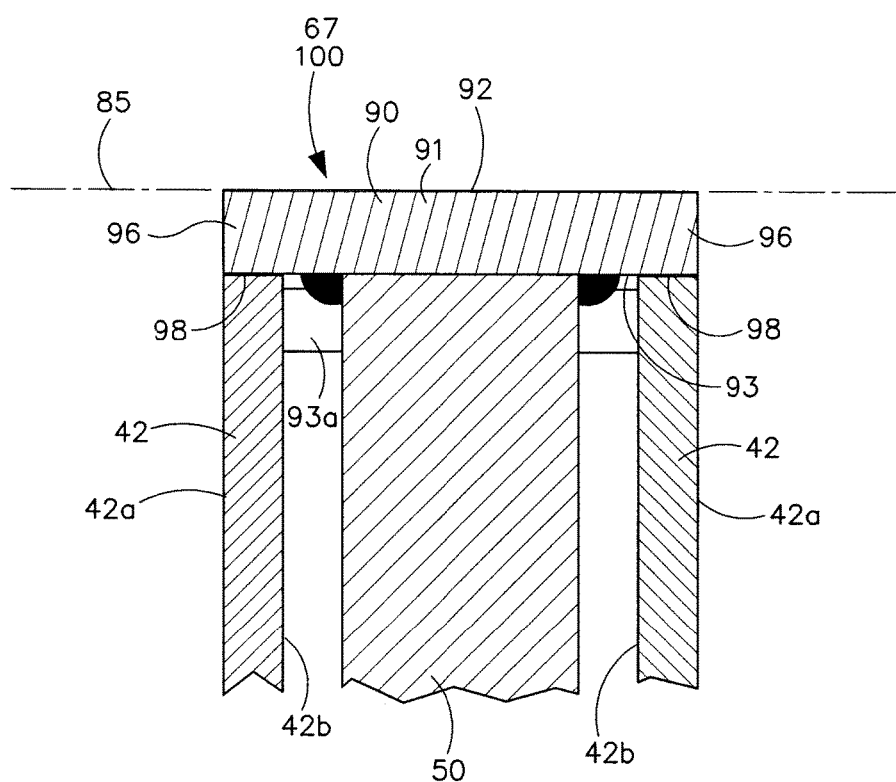
FIG. 2A is a cross-sectional view of FIG. 2 taken along line 2A-2A showing the impact plate secured to the hook and aligned with the shear plates when in the ramp forming position.

Spring housings 35 are rigidly secured to the mounting plate 31 as shown in FIG. 2. The spring housings 35 straddle the track 32. Each housing 35 includes one or more springs 36 to bias the vehicle restraint 20 into an upper position. One end of each spring 36 is secured to the top of its spring housing 35, and the opposed end of each spring is secured to the lower surface of the carriage assembly 40 (not shown). Each spring is sized to produce an average force of about 450 Newtons. Three springs 36 are preferably located on the motor side of the track 32 and one spring 36 is preferably located on the opposite side of the track to provide a more balanced lifting force for the carriage assembly 40. The springs 36 of the vehicle restraint 20 bias the carriage 40 into an upper position 38 to engage the ICC bar of a trailer.

The carriage assembly 40 extends horizontally from the mounting plate 31 and is slidably secured in the vertical track 32. The carriage assembly 40 includes two similarly shaped shear plates or load carrying plates 42. Each plate 42 is 5/16 inch thick and made of steal, such as ASTM A572 Grade 50 with a minimum yield strength of about 50,000 pounds per square inch (psi) and a Brinell-Hardness of about 135 HB. The plates 42 are in aligned registry, parallel to each other and spaced about 2½ inches apart.

The shear plates 42 have forwardly and downwardly sloped front ends 43 and flat horizontal upper ends 44. The shear plates 42 have flat vertical rear ends that are received by and extend into the track 32. The plates 42 are joined together by a pair of upper and lower guide rollers with elongated axles (not shown). These elongated axles pass through both plates 42 and engage the angle flanges 33 of the track 32. The elongated axles prevent the carriage 40 from pulling horizontally away from the mounting plate 31, while the rollers allow the carriage 40 to move vertically up and down in the track 32. The mounting plate 31, angle flanges 33, elongated guide roller axles and shear plates 42 hold the carriage 40 horizontally fixed to the front surface of the dock 10 to prevent outward movement or pull out of the carriage 40 from the dock 10.

The carriage assembly 40 includes a ramp extension leg 45 that is substantially flushly positioned between the parallel shear plates 42. The leg 45 has a square and tubular cross-sectional shape, upper surface 46 and top and bottom ends 47 and 48. A leg pin 49 rotatably joins the top end 47 of the leg 45 to the front ends 43 of the shear plates 42. The extension leg 45 extends at a forward and downward angle from the plates 42 to increase the length of the sloped forward ends 43 of the carriage 40.

The carriage assembly 40 carries a rotatable hook 50 to selectively engage and disengage the ICC bar 5 to hold the truck trailer against the loading dock 10. The hook 50 has an inner straight section 52, an elbow 54 and a pendent hooked end 55. The hooked portion 55 has an arcuate outer surface 57 and a grip disc 58. The hook 50 nests between the shear plates 42, and is rotatably secured to the plates by a hook pin 51 and hub and bearing assembly 59. The hub and bearing assemblies 59 allow the hook 50 to rotate about and transfer large loads to shear plates 42. The hook 50, hook pin and hub and bearing assemblies 59 are robustly sized to handle the large loads experienced during operation.

During operation, before a trailer backs into the loading dock 10, the carriage 40 is biased by springs 36 into a fully raised or upper position 60 as shown in FIGS. 2-6, 8-9 and 11. The hook 50 is stored between the shear plates 42 of the carriage 40. When the ICC bar 5 is lower than the upper surface 44 of the carriage 40, the ICC bar impacts the sloped front of the carriage to vertically lower the carriage along it track 32 until the ICC bar slides onto its upper surface 44. This contact with the ICC bar 5 moves the carriage down to a lower engaged position 61. The extension leg 45 remains in a forward and downward extending ramp forming position 62. Should the ICC bar of the trailer be lower than normal, the carriage 40 will move even lower where the lower end 48 of the extension leg 45 engages the ground 17. This causes the bottom end 48 of the leg 45 to rotate forward to a collapsed position 63. When the trailer is safely in the dock 10 with its ICC bar 5 engaging or sufficiently close to the face wall 11 or bumpers 12 of the dock, the motor 75 rotates the hook up along a path of travel 65 from its retained position 67 to its deployed position 68 and into engagement 68 with the ICC bar 5 as shown in FIGS. 3, 6, 9 and 10. The ICC bar 5 is captured by the hook 50 and carriage 40, and the trailer is held against the loading dock 10.

A drive unit 70 selectively rotates the hook 50 between its retracted and deployed positions 67 and 68. The drive unit 70 is mounted inside a protective housing 71 that is rigidly secured to the side of one of the shear plates 42. The drive unit 70 rotates the hook 50 to keep it in torque engaging contact with the ICC bar 5 during operation. The housing 71 has a removable cover 72 to allow access to the drive unit 70. The drive unit 70 includes an electric motor 75 that turns a drive shaft. A motor mount 77 collinearly aligns the drive shaft with the hook pivot pin 51, and a coupling 78 rotationally joins the motor drive shaft to the hook pin. The coupling 78 is preferably a direct one-to-one coupling between the motor drive shaft and the hook pin 51 to obtain a better mechanical advantage.

Figure 3:
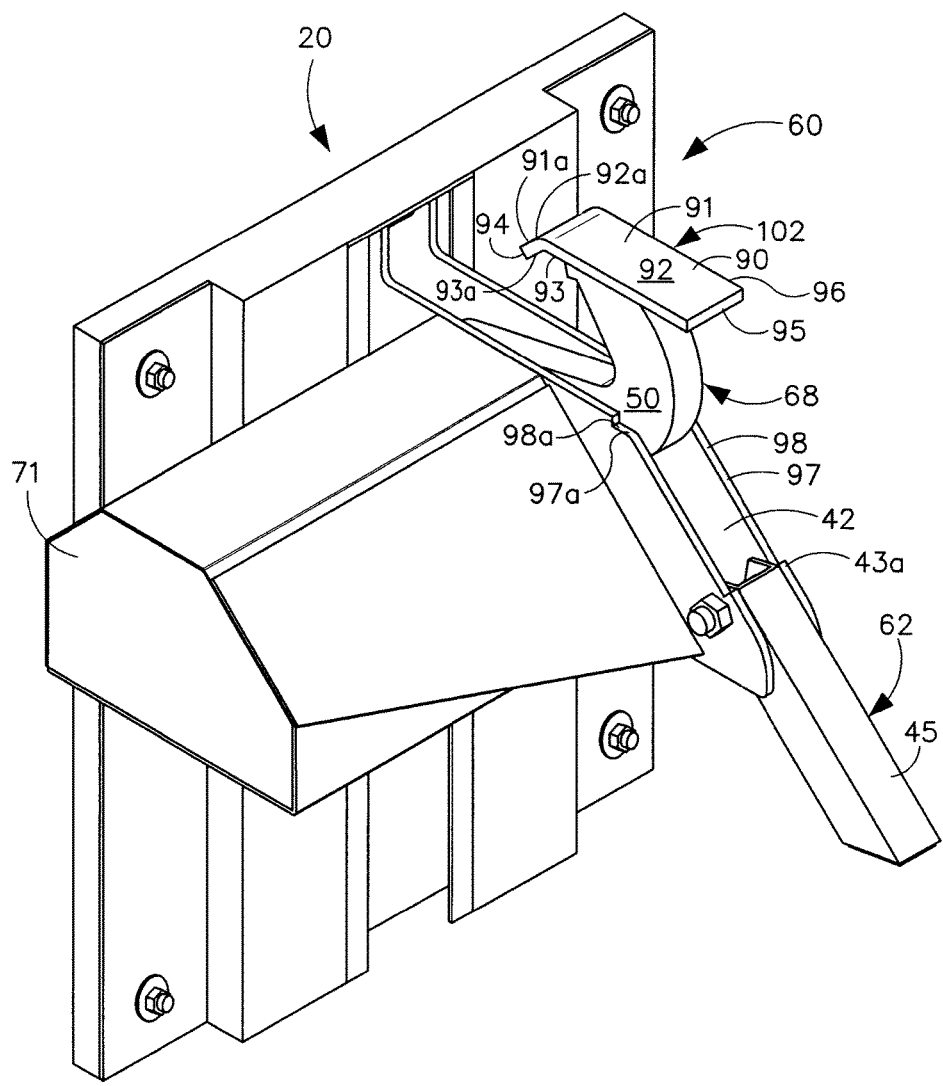
FIG. 3 is a perspective view of the first embodiment of the impact vehicle restraint with its hook deployed and impact plate raised from the shear plates.
Figure 4:
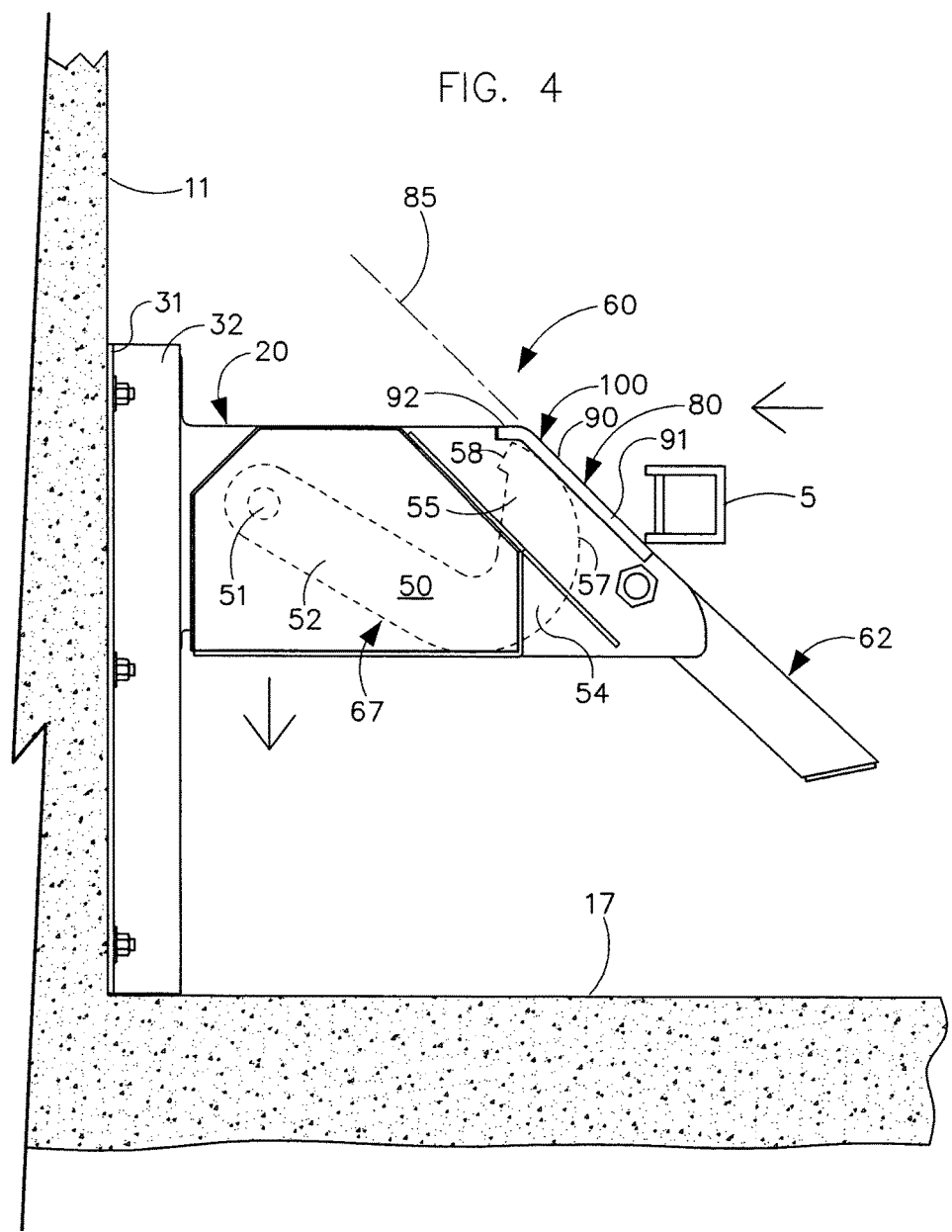
FIG. 4 is a side view of the first embodiment of the impact vehicle restraint with the carriage in its upwardly biased position the hook retracted and the impact plate in its ramp forming position, the impact plate being flushly received in the recesses of the shear plates, an ICC bar engaging the impact plate and the ramp extension leg in flush inclined alignment with the impact plate.

The carriage 40 includes a structured ramp impact zone 80 that forms a ramp plane 85 against which the ICC bar pressingly engages as it travels along the sloped front of the carriage. In a first embodiment, the structured ramp impact zone 80 includes a central impact plate 90 and the extension leg 45 as shown in FIGS. 2-4. The impact zone 80 also includes a portion 43*a* of the front end 43 of the shear plates 42 adjacent a slight gap between the impact plate and extension leg. The central impact plate 90 is held by and travels with the hook 50, and is welded or otherwise rigidly secured to the arcuate outer surface 57 of hook section 55. The plate 90 is preferably made of weldable steal, such as ASTM A572 Grade 50 with a minimum yield strength of about 50,000 psi and a hardness of about 135 HB. The plate 90 is about ⅜ inch thick and about 3 inches wide. The plate 90 has a main body 91 with generally rectangular shape and an integral angled forward extending upper lip 91*a*. The main body 91 is about 4 to 5 inches in length, and the angled lip portion 91*a* is about ½ inch in length. The plate 90 has upper and lower surfaces 92, 92*a*, 93 and 93*a*, and top 94, bottom 95 and side 96 ends. These surfaces and ends are generally flat and straight. The ramp plane 85 is formed by the upper surfaces 46 and 92 of the extension leg 45 and main body 91 of the plate 90, as well as the portion 43*a* of the shear plates 42 between them. The side ends 96 of the plate 90 are flush with the outer surfaces 42*a* of the shear plates 42 when in the ramp forming position 100. The upper surface 92 of the impact plate 90 has an impact surface area for engaging the ICC bar that is at least about four times greater than the impact surface area of the forward ends 43 of the shear plates 42.

The central impact plate 90 moves with the hook between a ramp forming position 100 when the hook is retracted 67 and a non-obstructing position 102 when the hook is deployed 68. The plate 90 forms a continuous side-to-side ramp for the ICC bar 5 to engage when in the ramp forming position 100. The front and upper ends 43 and 44 of the shear plates 42 have recesses 97 in aligned registry to supportably receive the central impact plate 90 when it is in its ramp forming position 100. Each recess 97 has an upper angled or horizontal portion 97*a*. The recesses 97 are sized to flushly and freely receive the side ends 96 of the impact plate 90. Each recess 97, 97*a* is about ⅜ inch deep and has flat bottom supporting surfaces 98, 98*a* to flushly engage the flat lower surfaces 93, 93*a* of the impact plate 90, so that its upper surfaces 92, 92*a* are flush with the front 43 and upper 44 ends of the shear plates 42 when in the ramp forming position 100. The upper angled portion 97*a* flushly receives the bent or angled lip 91*a* of the impact plate 90, such that upper surface 92 of the lip is flush with the upper end 44 of the shear plates 42 when the plate 90 is received by the recess 97, 97*a* and supportingly engaging the supporting surface 98, 98*a*.

Figure 5:
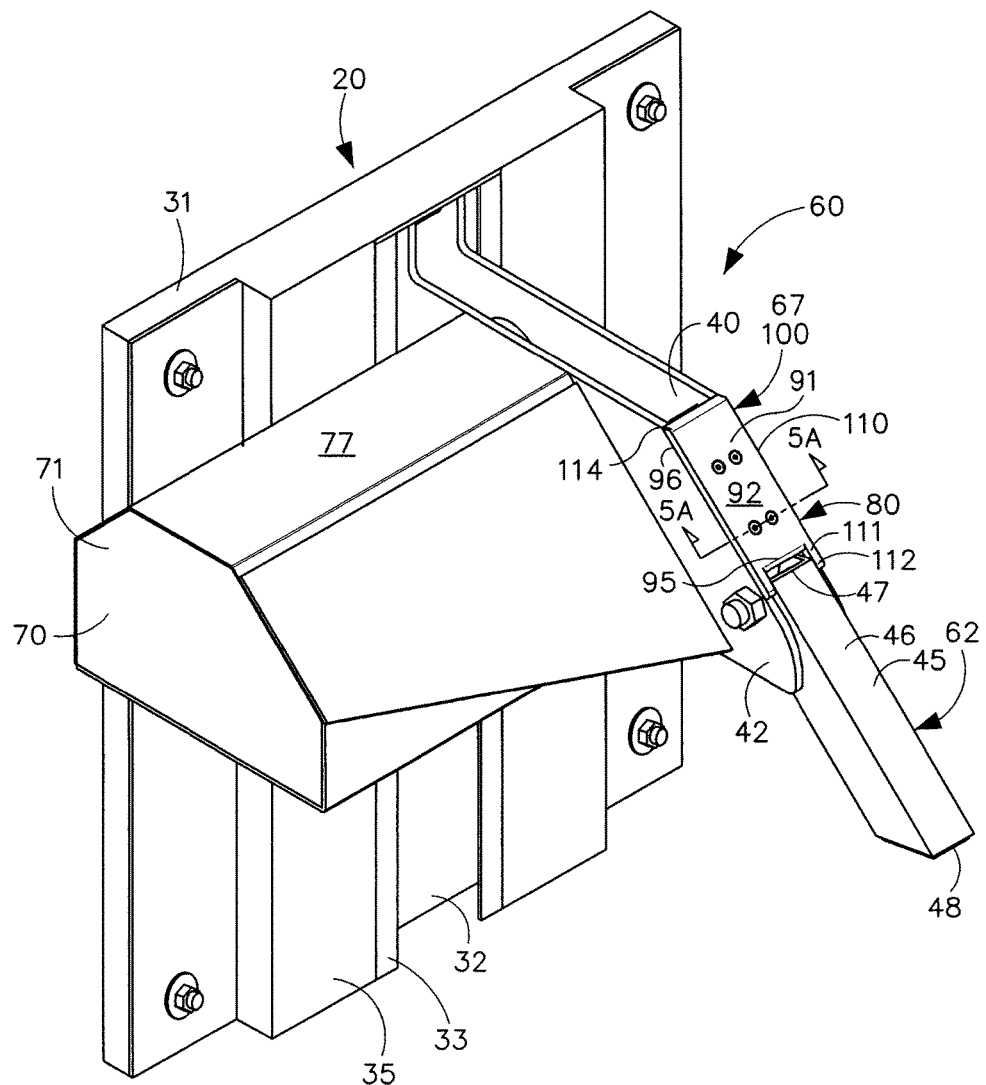
FIG. 5 is a perspective view of a second embodiment of the impact vehicle restraint in its upwardly biased position with the structured ramp impact zone and ramp plane formed by a central impact plate 110 flushly and supportably engaging the front ends of the shear plates to form a continuous side-to-side ramp, and with the lower ramp leg extension aligned with the ramp plane.
Figure 5A:
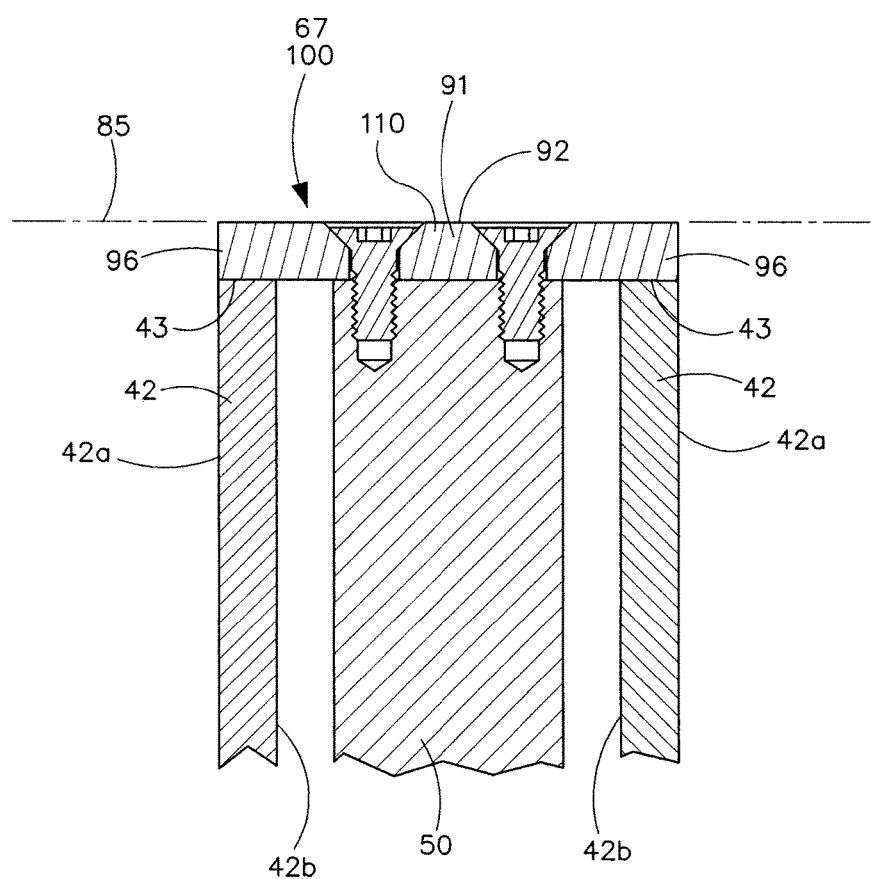
FIG. 5A is a cross-sectional view of FIG. 5 taken along line 5A-5A showing the impact plate secured to the hook and aligned with the shear plates when in the ramp forming position.
Figure 6:
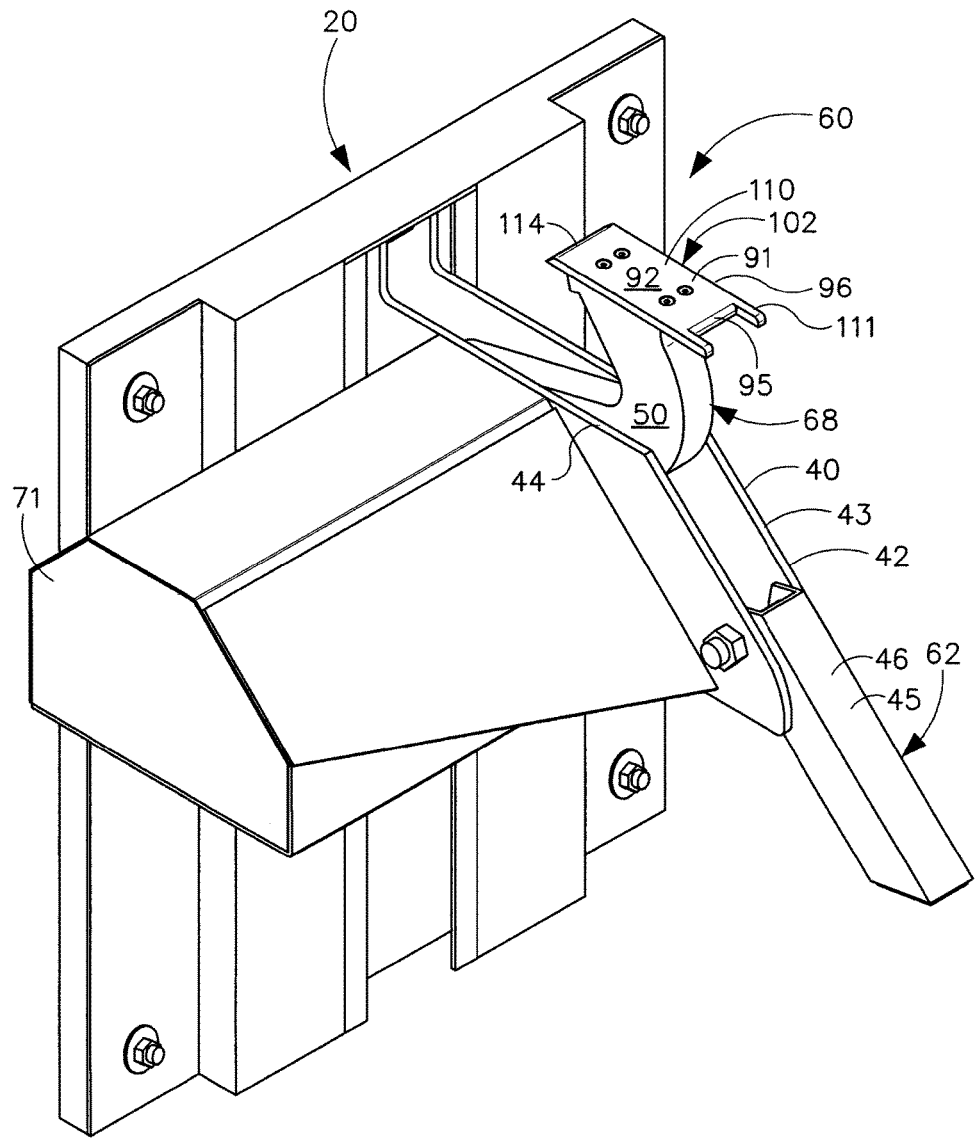
FIG. 6 is a perspective view of the second embodiment of the vehicle restraint with its hook deployed and the impact plate raised from the shear plates.
Figure 7:
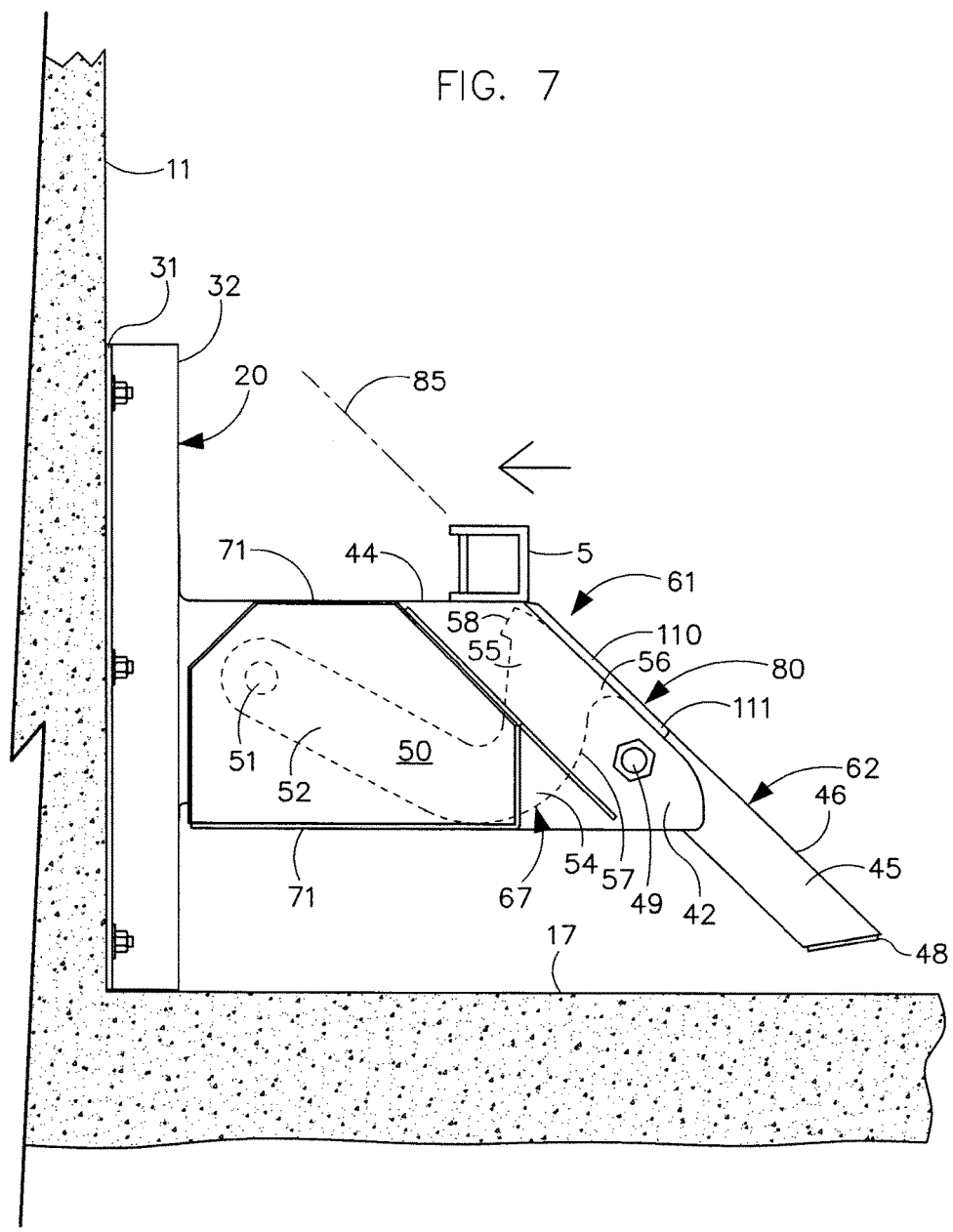
FIG. 7 is a side view of a second embodiment of the impact vehicle restraint with the carriage in an engaged position with the ICC bar on the top ends of the shear plates, the hook retracted and the impact plate in its ramp forming position and the ramp extension leg in flush inclined alignment with the impact plate.

A second embodiment of the structured ramp impact zone 80 is shown in FIGS. 5-7. In this embodiment, the impact zone 80 includes a central impact plate 110 and the ramp extension leg 45. The central impact plate 110 is held by and travels with the hook 50. The plate 110 is rigidly secured to a flat outer surface of a built up portion 56 of the hook section 55 such as by countersunk screw fasteners. The shear plates 42 do not have a recess 97. The plate 110 supportingly engages the forward ends 43 of the shear plates 42. The plate 110 has integral spaced lower side tabs 111 that extend linearly downward from the sides of the bottom end 95 of the plate. The elongated tabs 111 supportingly engage the shear plates 42, and extend in overlapping alignment with the ramp extension leg 45. The top end 114 of the plate 110 does not include the angled lip 91*a*. The top end 114 is beveled to flushly meet the upper end 44 of the shear plates 42.

The size and shape of the impact plate 110 are similar to that of the main body 91 of the first embodiment. The plate 110 is generally rectangular shape with upper and lower surfaces 92 and 93, and top 114, bottom 95 and side 96 ends. These surfaces and ends are generally flat and straight. The tabs 111 have upper surfaces 112 that are planar to the upper surface 92 of the plate 110. The bottom ends of the tabs 111 are beveled. The ramp plane 85 is formed by the upper surfaces 46, 92 and 112 of the leg 45 and plate 110. The side ends 96 and tabs 111 of the plate 110 are flush with the outer surfaces 42*a* of the shear plates 42. The tabs 111 are positioned over the front ends 43 of the shear plates 42 when the hook 50 is retracted 67 and the plate 110 is in its ramp forming position 100. The upper surfaces 92 of the impact plate 110 and tabs 111 are planar to the upper surface 46 of the extension leg 45 and combine to form the ramp plane 85 when both components 45 and 110 are in their ramp forming positions 62 and 100. This is accomplished by installing of a filler plate on the upper surface 46 of the extension leg 45, or by locating the leg pivot pin 49 so that the upper surface 46, 92 and 112 are planar when so positioned 62 and 100. The plate 110 forms a continuous side-to-side ramp for the ICC bar 5 to engage when in the ramp forming position 100.

Figure 8:
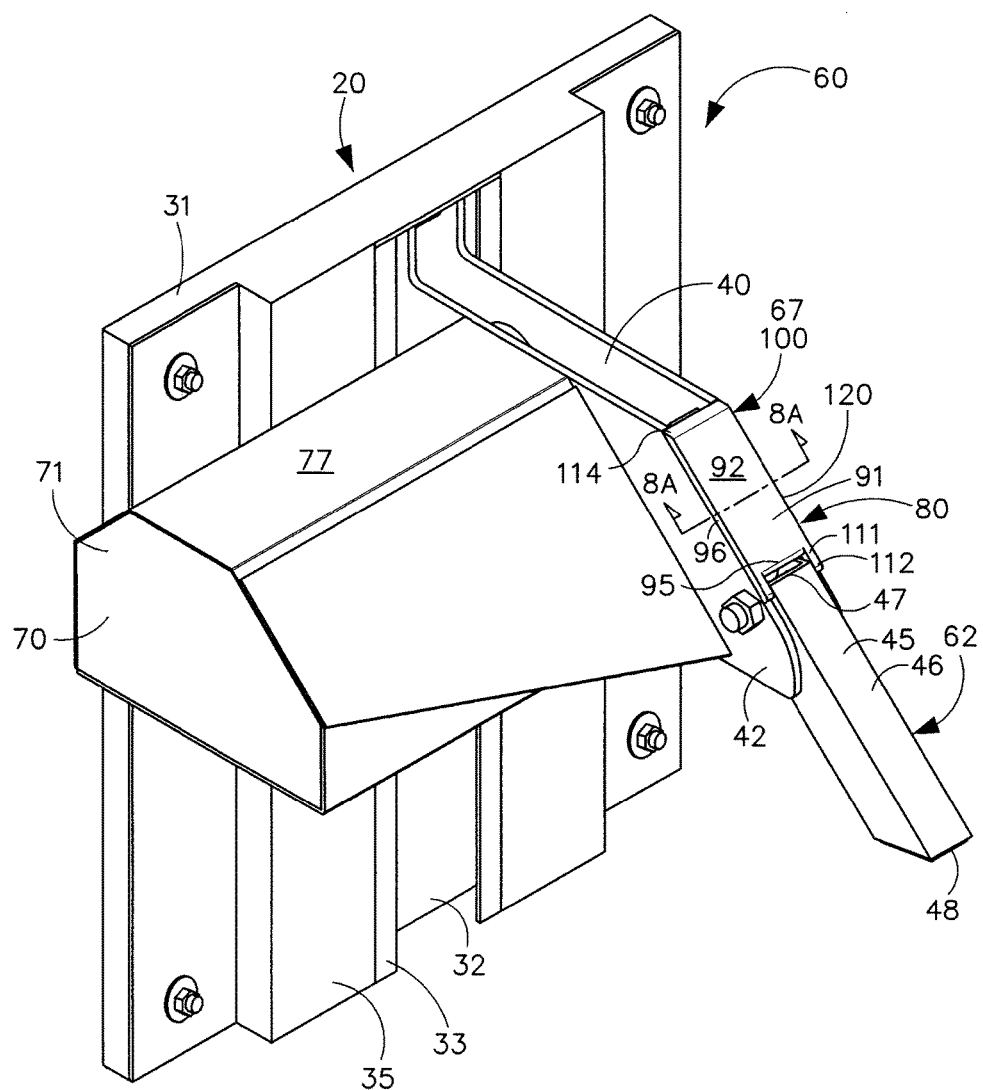
FIG. 8 is a perspective view of a third embodiment of the impact vehicle restraint in its upwardly biased position with the structured ramp impact zone and ramp plane formed by a floating, central impact plate 120 flushly and supportably engaging the front ends of the shear plates to form a continuous side-to-side ramp, and with the ramp extension leg aligned with the ramp plane.
Figure 8A:
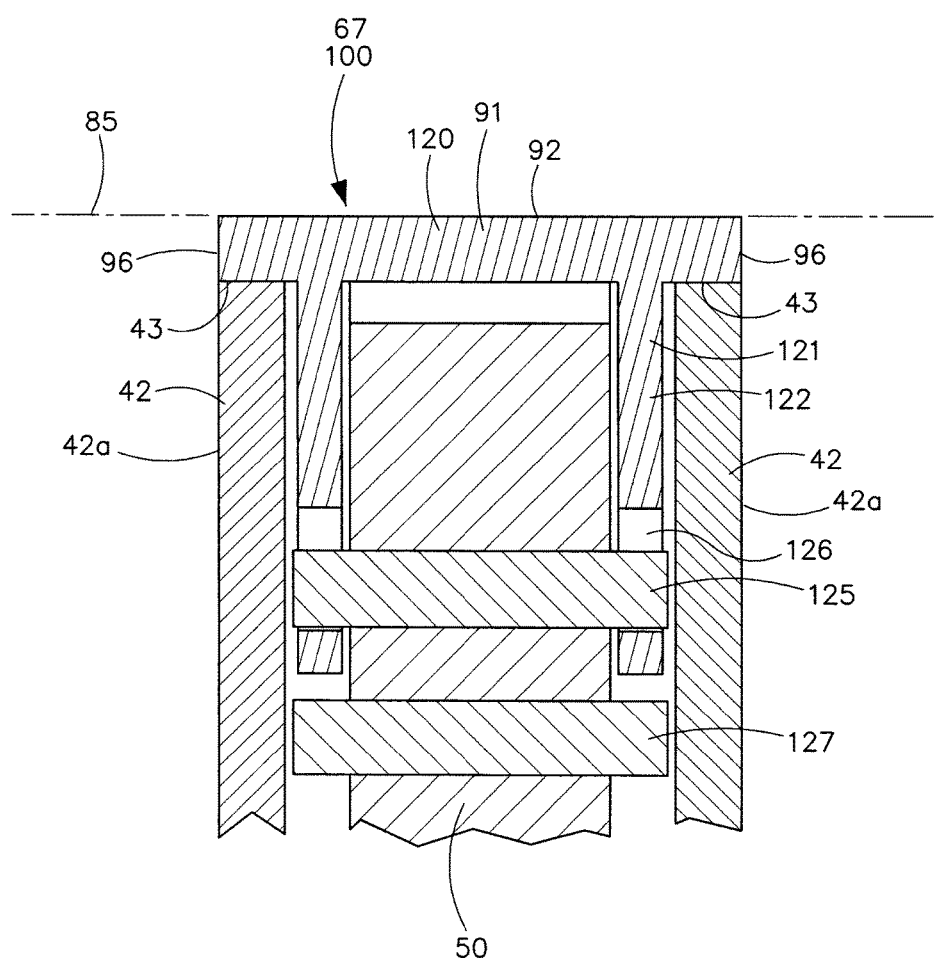
FIG. 8A is a cross-sectional view of FIG. 8 taken along line 8A-8A showing the floating impact plate pivotally secured to the hook and aligned with the shear plates when in the ramp forming position.
Figure 9:
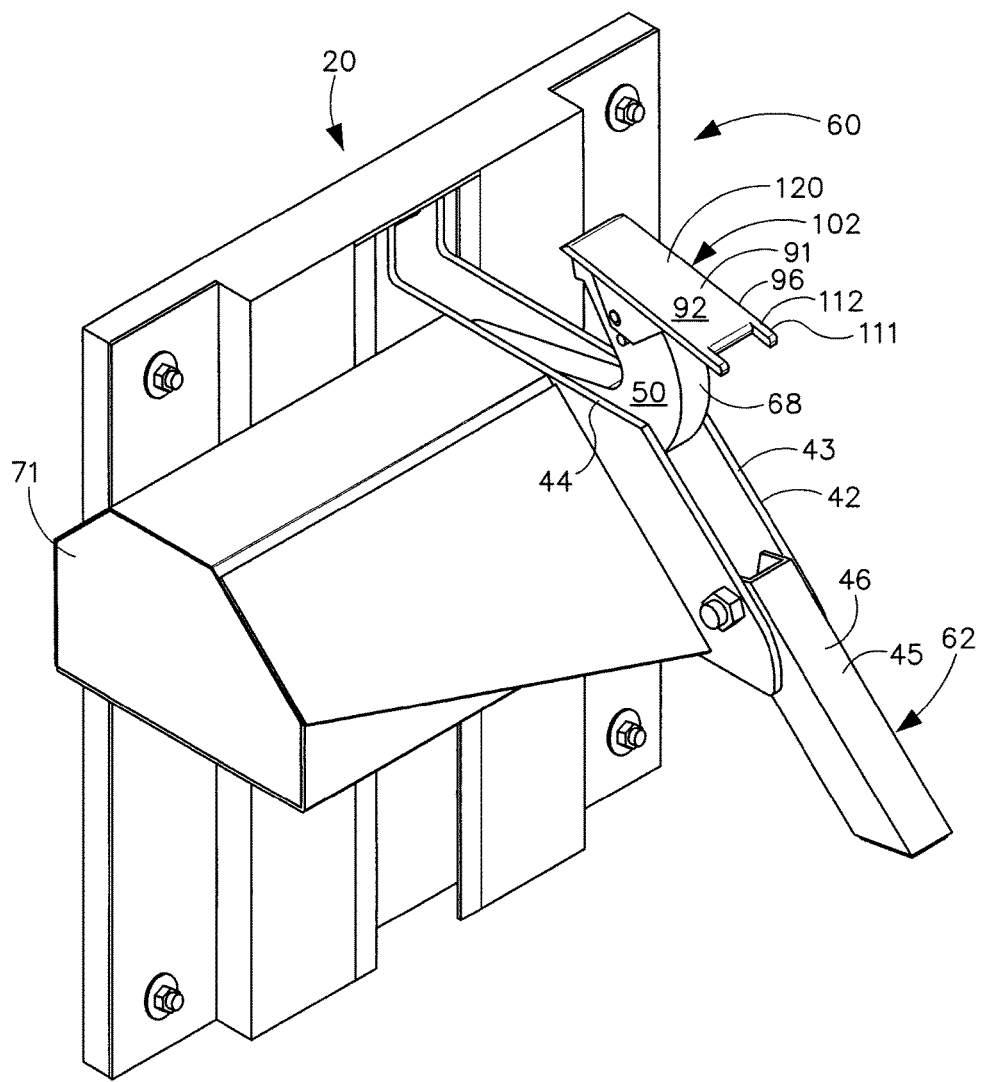
FIG. 9 is a perspective view of the third embodiment of the impact vehicle restraint with its hook deployed and the floating impact plate raised from the shear plates.
Figure 10:
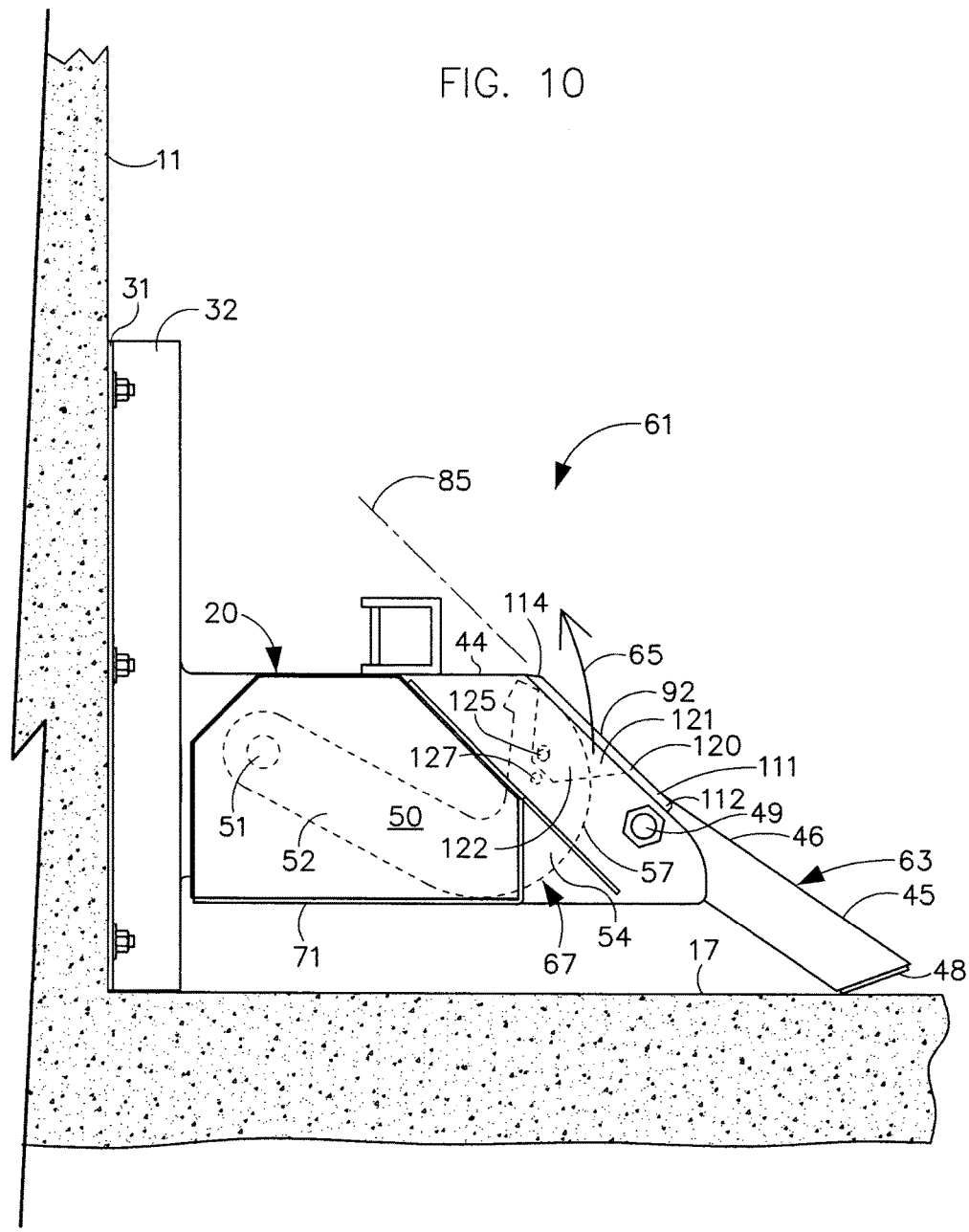
FIG. 10 is a side view of the third embodiment of the impact vehicle restraint with the carriage in an engaged position with the ICC bar on the top ends of the shear plates, the hook retracted and the impact plate in its ramp forming position and the ramp extension leg engaging the ground and rotated forward.

A third embodiment of the structured ramp impact zone 80 is shown in FIGS. 8-10. The impact zone 80 includes the central impact plate 90 and the ramp extension leg 45. In this embodiment, the central impact plate 90 is pivotally held by and travels with the hook 50. The impact plate 120 is pivotally secured to the hook 50 via a pivot mechanism 121. The central plate 120 has a pair of spaced brackets 122 extending from its lower surface 93 that straddle the sides of the hook 50. A pivot pin 125 passes through the hook 50 and brackets 122 to pivotally join the impact plate 120 to the hook. The brackets 122 have a slotted opening 126 and a stop pin 127 to allow a degree of up and down and pivotal movement of the plate 120 to ensure its flush engaging against the front ends 43 of the shear plates 42.

The size and shape of the plate 120 and its alignment and engagement with the shear plates 42 is otherwise similar to the second embodiment. The impact plate 120 has a main body 91 with generally rectangular shape, and lower extending side tabs 111. The ramp plane 85 is formed by the upper surfaces 92 and 46 of the plate 120 and leg 45, as well as the upper surface of the tabs 111. The side ends 96 of the plate 120 are flush with the outer surfaces 42*a* of the shear plates 42. The side ends 96 also supportingly engage the forward ends 43 of the shear plates 42. The tabs 111 are also supportingly engage the front ends 43 of the shear plates 42 and extend in overlapping alignment with the ramp extension leg 45. The upper surfaces 92 of the impact plate 120 and tabs 111 are planar to the upper surface 46 of the extension leg 45 and combine to form the ramp plane 85 when both components 45 and 120 are in their ramp forming positions 62 and 100. The plate 120 forms a continuous side-to-side ramp for the ICC bar 5 to engage when in the ramp forming position 100.

Figure 11:
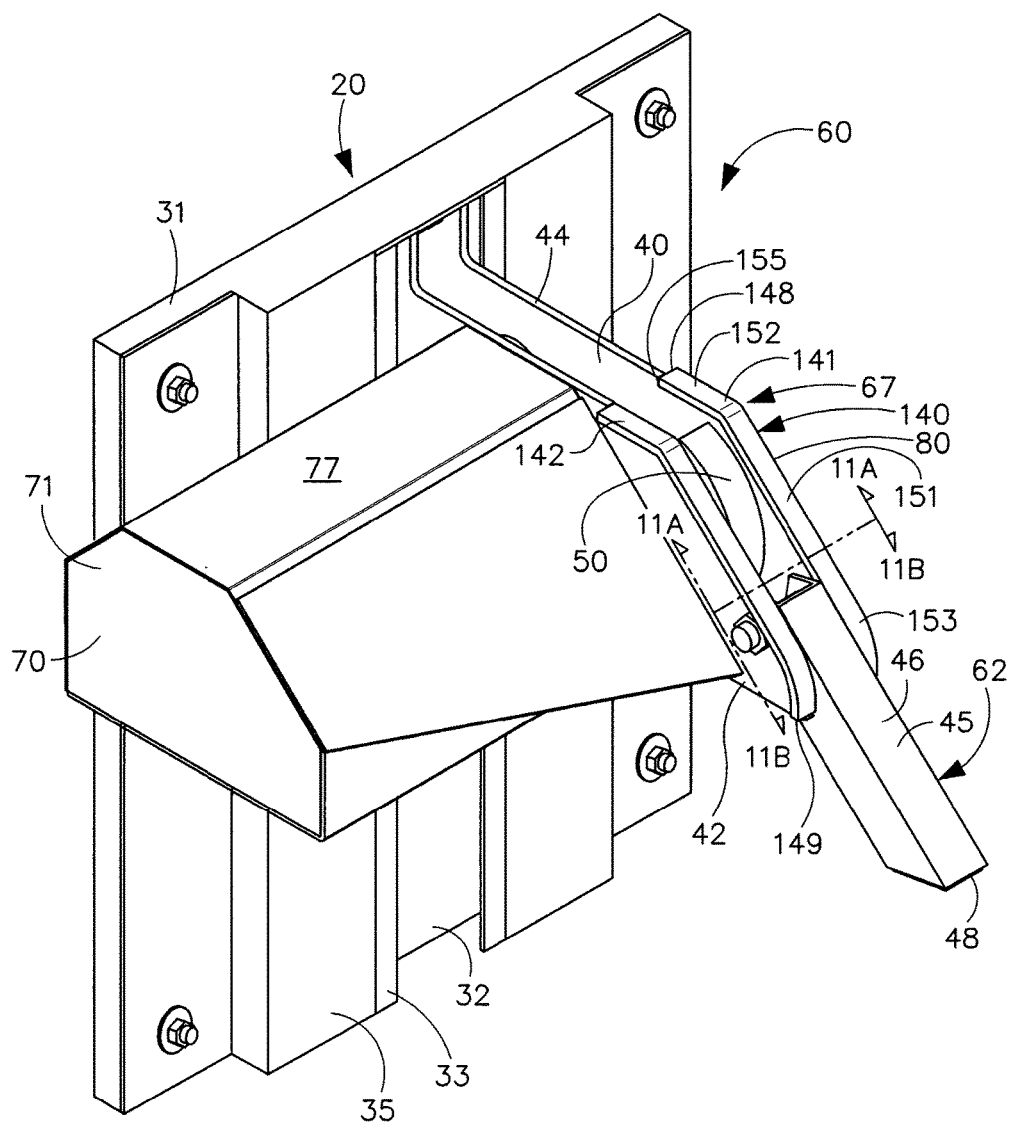
FIG. 11 is a perspective view of a fourth embodiment of the vehicle restraint in its upwardly biased position with the structured ramp impact zone and ramp plane formed by dual impact zones 140 with hardened, contoured, impact strips 141 and 142 welded in recesses of the shear plates, and with the lower ramp leg extension aligned with the ramp plane.
Figure 11A:
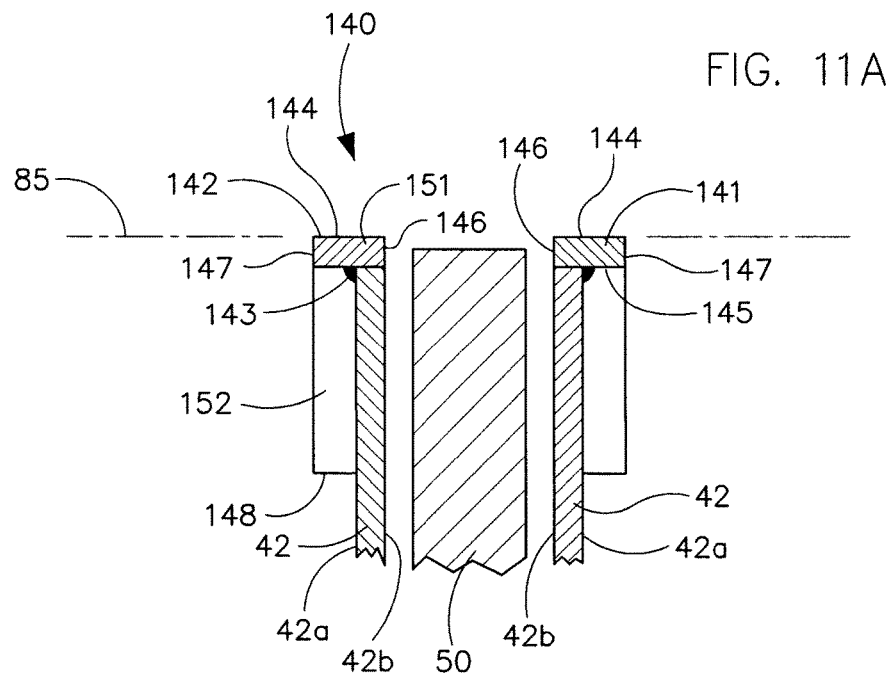
FIG. 11A is a cross-sectional view of FIG. 11 taken along line 11A-11A showing the hardened, contoured, impact strips welded to the shear plates, and with the hook between the impact strips.
Figure 11B:
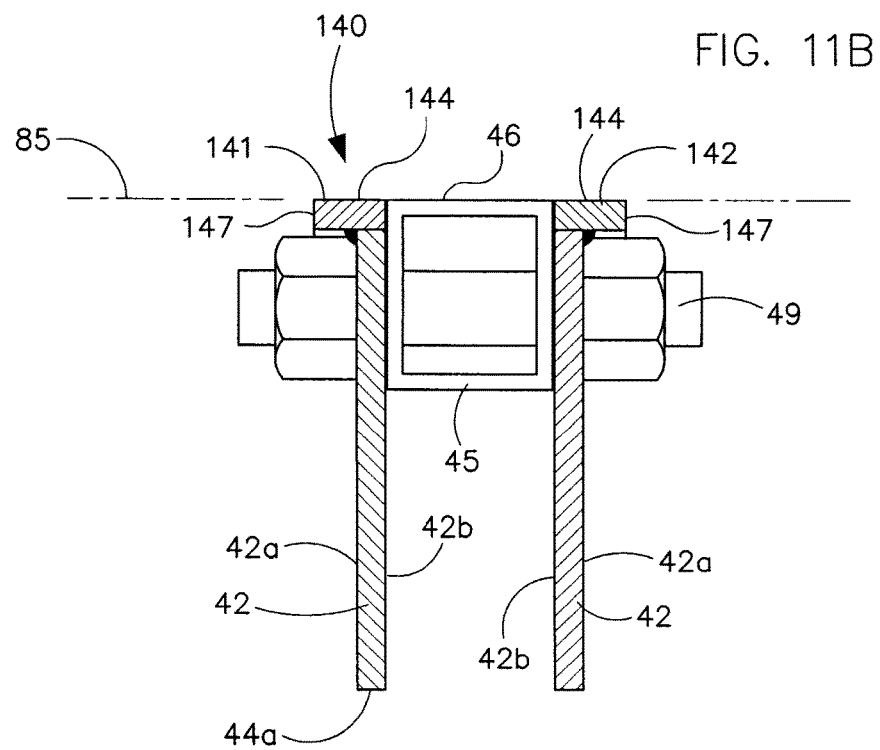
FIG. 11B is a cross-sectional view of FIG. 11 taken along line 11B-11B showing the hardened, contoured, impact strips welded to the front end of the shear plates and the ramp extension leg between the impact strips.

A fourth embodiment of the structured ramp impact zone 80 is shown in FIGS. 11, 11A and 11B. The impact zone 80 is formed by dual side impact zones 140 formed by impact strips 141 and 142. Each strip 141 or 142 is rigidly secured to the front 43 and upper 44 ends of one shear plates 42, and is preferably welded 143 to the plate. The impact strips 141 and 142 have a minimum yield strength of at least about 100,000 psi, and have a strength of at least twice that of the shear plates 42. The impact strips 141 and 142 have a minimum hardness of at least about 300 HB, and have a harness of at least twice that of the shear plates 42. The impact strips are preferably made of a weldable, high strength metal, such as AR-400 steal with a yield strength of 145,000 psi and a Brinell Hardness of 360-440 HB.

Each impact strip 141 and 142 has the same general shape to accommodate the shape of the forward end 43 and upper end 44 of the shear plate 42. The strips 141 and 142 have a uniform thickness of about ½ of an inch defined by its upper and lower surfaces 144 and 145, a uniform width of about ¾ inch defined by its inner and outer side ends 146 and 147 and a total unbent length of about one foot defined by its top and bottom ends 148 and 149. The side ends 143 are generally planar or flat. The strips 141 and 142 have integral central, upper and lower portions 151, 152 and 153. The central portion 151 has upper and lower surfaces 144 and 145 that are planar or flat. The planar central portion 151 extends from the upper end 44 of the shear plate 42 to a location beyond the top end 47 of the extension leg 45 so that it overlaps with the extension leg 45. The upper portion 152 is angled relative to the central portion 151. The angled upper portion 152 has upper and lower surfaces 144 and 145 that are planar or flat. The angled upper portion 152 extends from the front end 43 of the shear plate 42 to a location about five inches rearwardly along the upper end 44. The lower portion 153 is curved. The lower curved portion 153 has upper and lower surfaces 144 and 145 that are inwardly curved. The curved portion 155 extends from the flat central portion 151 to the bottom 44a of the front end 43 of the shear plate 42.

The impact strips 141 and 142 are shaped to flushly engage the front and upper ends of the shear plates 42, with each strip being welded to one of the plates. The upper end 44 of each shear plate 42 has a recess 155. The recesses 155 are in aligned registry to receive the angled upper portion 152 of the impact strips 141 and 142. Each recess 155 is about ½ inch deep so that the upper surface 144 of its welded strip 141 or 142 is flush with the upper end 44 of the shear plate 42. The inner side end 146 of each impact strip 141 and 142 is flush with the inside surface 42b of its respective shear plate 42. The outer side end 147 of each strip 141 or 142 extends outwardly from the outer surface 42a of its respective shear plate 42. The ramp plane 85 is formed by the upper surfaces 46 and 144 of the extension leg 45 and impact strips 141 and 142. The upper surfaces 144 of the impact strips 141 and 142 produce an impact surface area for engaging the ICC bar that is at least two times greater than the impact surface area of the front ends 43 of the shear plates 42. The upper angled portion 152 of the impact strips 141 and 142 provide a smooth transition for the ICC bar when transferring from pressed engagement with the ramp portion 144 of the strips to pressed engagement with the upper end 44 of the carriage 40. The curved lower portion 153 of the impact strips 141 and 142 provide a smooth transition for the ICC bar when transferring between pressed engagement with the upper surface 46 of the extension leg 45 and pressed engagement with the ramp portion 144 of the strips 141 and 142.

In each of the above embodiments, the hook 50 is housed between the shear plates 42 when in its retracted or stored position 67. The hook is behind the ramp plane 85 of the structured ramp impact zone 80 as shown in FIGS. 4, 7, 10 and 11. In this retracted position 67, the ICC bar 5 of a trailer is free to slide along the ramp plan 85 formed by the impact zone 80 without engaging the hook 50. When the ICC bar 5 is located above the upper edge 44 of the carriage 40, the hook 50 rotates along a path of travel 65 from the retracted position 67 to a deployed or raised operating position 68 to engage the ICC bar 5 as shown in FIGS. 3, 6, 9 and 10.

While this invention is susceptible to embodiments in many different forms, the drawings show and the specification describes preferred embodiments of the invention. It should be understood that the drawings and specification are to be considered an exemplification of the principles of the invention. They are not intended to limit the broad aspects of the invention to the embodiments illustrated. Various changes may be made and equivalents may be substituted without departing from the broader aspects of the invention.

We claim:

1. An impact vehicle restraint for securing a trailer to a loading dock, the loading dock having a face wall and the trailer having an ICC bar, said impact vehicle restraint comprising:
   a track anchored proximal the face wall of the dock;
   a carriage joined to said track and movable between upper and lower ICC bar engaging positions, said carriage having shear plates with forward sloped ends, and a hook rotatably secured between said shear plates and selectively movable along a path of travel between retracted and deployed positions;
   a motor held by and traveling with said carriage, said motor being drivingly connected to said hook via a hook pivot pin to selectively deploy and retract said hook;
   a structured ramp impact zone formed by a central impact plate and a ramp extension leg, said central impact plate having upper and lower plate surfaces and opposed plate sides, said impact plate being held by and traveling with said hook and being in a ramp forming position when said hook is in said retracted position, said opposed plate sides supportably engaging said forward sloped ends of said shear plates and said upper plate surface forming an angularly fixed ramp plane when in said ramp forming position, said ramp extension leg being rotatably mounted between said shear plates, said extension leg having an upper leg surface and a lower leg end and being movable between ramp forming and collapsed positions, said upper leg surface being in overlapping alignment with said upper plate surface and forming said structured ramp impact zone when said leg is in its said ramp forming position, and said lower leg end rotating forward when in said collapsed position; and,
   wherein said hook is behind said ramp plane when in said retracted position and passes through said ramp plane when moving along said path of travel between retracted and deployed positions, and the ICC bar pressingly engages and smoothly travels along said structured ramp impact zone between said extension leg and impact plate when engaging said carriage.

2. The impact vehicle restraint of claim 1, and wherein said central impact plate forms a continuous side-to-side ramp between said shear plates when in said ramp forming position.

3. The impact vehicle restraint of claim 1, and wherein each of said forward sloped ends of said shear plates has a recess with a supporting surface, and each of said opposed plate sides is flushly received by one of said recesses and engages its said supporting surface when in said ramp forming position, said upper plate surface being in planar alignment with one of either said forward sloped end of said shear plate and said upper leg surface of said extension leg when in said ramp forming position.

4. The impact vehicle restraint of claim 1, and wherein said impact plate is rigidly secured to said hook.

5. The impact vehicle restraint of claim 4, and wherein said hook has an elongated portion and an upper hooked portion with an arcuate upper surface, and said impact plate is secured to said arcuate upper surface.

6. The impact vehicle restraint of claim 1, and wherein said impact plate is pivotally secured to said hook.

7. The impact vehicle restraint of claim 1, and wherein said impact plate has a main body with a substantially rectangular shape and a planar upper surface.

8. The impact vehicle restraint of claim 3, and wherein said shear plates have an upper shear plate end, and each said recess has an upper recess portion extending along said upper shear plate end, said impact plate has an upper lip portion, and said upper lip portion is received by said upper recess when said impact plate is in said ramp forming position.

9. The impact vehicle restraint of claim 1, and wherein said shear plates have substantially horizontal upper ends, said impact plate has upper and lower impact plate ends, said upper impact plate end is flush with said horizontal upper ends when in said ramp forming position, and said lower impact plate end has opposed side tabs extending in overlapping and planar alignment with said upper surface of said ramp extension leg and form said ramp plan when in said ramp forming position.

10. The impact vehicle restraint of claim 1, and wherein said carriage has an upper end and said hook is below said upper end when in said retracted position, and said hook extends above said upper end when in said deployed position.

11. An impact vehicle restraint for securing a trailer to a loading dock, the loading dock having a face wall and the trailer having an ICC bar, said impact vehicle restraint comprising:
- a track anchored proximal the face wall of the dock;
- a carriage joined to said track and movable between upper and lower ICC bar engaging positions, said carriage having shear plates made of weldable metal with forward sloped shear plate ends, upper shear plate ends with a recess and inner and outer shear plate surfaces, and a hook rotatably secured between said shear plates and selectively movable along a path of travel between retracted and deployed positions;
- a motor held by and traveling with said carriage, said motor being drivingly connected to said hook via a hook pivot pin to selectively deploy and retract said hook;
- a structured ramp impact zone formed by dual impact strips and a ramp extension leg, each impact strip having a planar central portion, angled upper lip portion, curved lower portion, upper and lower strip surfaces and inner and outer strip sides, said upper lip portion being received by said upper shear plate recess, each said impact strip being welded to one of said forward sloped shear plate ends, said inner strip sides being flush with said inner shear plate surfaces, said strip plates extending outwardly from said outer shear plate surfaces, and said upper lip portions are in planar alignment with said upper shear plate ends, said impact strips being weldable metal with a yield strength of a least about 100,000 psi, and said upper strip surfaces of said planar central portions forming an angularly fixed ramp plane, said ramp extension leg being rotatably mounted between said shear plates, said extension leg having an upper leg surface, side leg surfaces and upper and lower leg ends and being movable between ramp forming and collapsed positions, said planar central portions extending beyond said upper leg end, said upper leg surface being in overlapping alignment with said upper strip surfaces and forming said ramp impact zone and said curved lower portions extending along said side leg surfaces when said leg is in its said ramp forming position, and said lower leg end rotating forward when in said collapsed position; and,
- wherein said hook is behind said ramp plane when in said retracted position and passes through said ramp plane when moving along said path of travel between deployed and retracted positions, and the ICC bar pressingly engages and smoothly travels along said structured ramp impact zone between said extension leg and impact strips and along said shear plates between said upper plate ends and said impact strips when engaging said carriage.

12. The impact vehicle restraint of claim 11, and wherein said forward sloped shear plate ends form a combined shear plate surface area, said upper surfaces of said impact strips form a combined impact strip surface area, and said combined impact strip surface area is at least two times greater than said combined shear plate surface area.

13. The impact vehicle restraint of claim 12, and wherein said shear plates have a predetermined yield strength, and said impact strips have a yield strength of at least about twice said predetermined yield strength of said shear plates.

14. The impact vehicle restraint of claim 13, and wherein said shear plates have a yield strength of at least 50,000 psi, and said impact strips have a yield strength of at least about 140,000 psi.

15. The impact vehicle restraint of claim 14, and wherein said impact strips have a Brinell Hardness of at least about 360.

16. The impact vehicle restraint of claim 11, and wherein said impact strips have a main body with a substantially rectangular shape and planar upper surface.

* * * * *